United States Patent
Nguyen et al.

(10) Patent No.: US 11,876,790 B2
(45) Date of Patent: Jan. 16, 2024

(54) AUTHENTICATING COMPUTING DEVICES BASED ON A DYNAMIC PORT PUNCHING SEQUENCE

(71) Applicant: The Boeing Company, Chicago, IL (US)

(72) Inventors: Daniel Nguyen, Auburn, WA (US); Adrian D. Pirvu, Seattle, WA (US); Michael R. Vanguardia, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 175 days.

(21) Appl. No.: 16/748,500

(22) Filed: Jan. 21, 2020

(65) Prior Publication Data
US 2021/0226936 A1 Jul. 22, 2021

(51) Int. Cl.
*H04L 9/40* (2022.01)
*H04W 12/08* (2021.01)

(52) U.S. Cl.
CPC .......... *H04L 63/08* (2013.01); *H04L 63/0428* (2013.01); *H04L 63/10* (2013.01); *H04W 12/08* (2013.01)

(58) Field of Classification Search
CPC ..... H04L 63/08; H04L 63/10; H04L 63/0428; H04L 63/0236; H04L 63/12; H04L 63/083; H04L 63/108; H04W 12/08
See application file for complete search history.

(56) References Cited

U.S. PATENT DOCUMENTS

| | | | | |
|---|---|---|---|---|
| 6,246,684 B1 * | 6/2001 | Chapman | ............... | H04L 47/10 370/363 |
| 6,360,271 B1 * | 3/2002 | Schuster | ............ | H04L 65/1101 710/52 |
| 6,385,451 B1 * | 5/2002 | Kalliokulju | ........... | H04W 36/28 370/332 |
| 6,512,761 B1 * | 1/2003 | Schuster | ............ | H04L 12/1485 370/352 |
| 6,539,026 B1 * | 3/2003 | Waclawsky | ........... | H04L 47/781 370/428 |
| 6,717,917 B1 * | 4/2004 | Weissberger | ......... | H04L 41/142 709/224 |
| 6,725,390 B1 * | 4/2004 | Liu | ........................... | G06F 1/10 713/401 |
| 6,862,298 B1 * | 3/2005 | Smith | .................... | H04L 65/80 370/429 |
| 7,197,556 B1 * | 3/2007 | Short | ..................... | H04L 67/04 709/224 |

(Continued)

FOREIGN PATENT DOCUMENTS

EP 3796579 A1 * 3/2021 ............ H03M 13/09

*Primary Examiner* — Aravind K Moorthy
(74) *Attorney, Agent, or Firm* — MH2 Technology Law Group LLP (57) ABSTRACT

A computer-implemented method includes: receiving, by an authentication device, from a client device and via a network device, a plurality of passcode packets as part of a request to be authenticated by the authentication device; recording, by the authentication device, a sequence of port identifiers corresponding to respective ports of the network device via which the plurality of passcode packets are received; and authenticating, by the authentication device, the client device based on the sequence of port identifiers.

20 Claims, 6 Drawing Sheets

(56) References Cited

U.S. PATENT DOCUMENTS

| | | | | |
|---|---|---|---|---|
| 7,254,616 B1* | 8/2007 | Ennis | .................. | H04L 49/20 370/390 |
| 7,257,469 B1* | 8/2007 | Pemble | .................. | G01C 23/005 340/945 |
| 7,346,005 B1* | 3/2008 | Dowdal | .................. | H04L 43/106 370/252 |
| 7,516,255 B1* | 4/2009 | Hobbs | .................. | G06F 3/1454 710/72 |
| 7,823,194 B2* | 10/2010 | Shay | .................. | H04L 63/0227 726/13 |
| 8,149,863 B1* | 4/2012 | Sahotra | .................. | H04W 74/0825 455/501 |
| 8,670,466 B1* | 3/2014 | Sathe | .................. | H04J 3/0673 370/235 |
| 8,706,865 B1* | 4/2014 | L'Heureux | .................. | H04L 67/101 709/224 |
| 8,934,492 B1* | 1/2015 | King | .................. | H04L 12/4675 370/397 |
| 10,142,214 B2* | 11/2018 | Kim | .................. | H04L 65/1059 |
| 10,523,685 B1* | 12/2019 | Kostka | .................. | H04W 12/03 |
| 10,698,030 B1* | 6/2020 | Parodi | .................. | G01R 31/318385 |
| 10,735,339 B1* | 8/2020 | Matthews | .................. | H04L 47/56 |
| 10,979,390 B2* | 4/2021 | Hiramoto | .................. | H04L 63/0209 |
| 11,075,847 B1* | 7/2021 | Kwan | .................. | H04L 47/2441 |
| 2002/0147820 A1* | 10/2002 | Yokote | .................. | H04W 12/0431 709/229 |
| 2003/0056097 A1* | 3/2003 | Araki | .................. | H04L 63/083 713/168 |
| 2003/0065799 A1* | 4/2003 | Kitamura | .................. | G06Q 20/425 709/230 |
| 2003/0101273 A1* | 5/2003 | Hensbergen | .................. | H04L 69/329 709/232 |
| 2003/0161276 A1* | 8/2003 | Lundberg | .................. | H04M 3/56 370/267 |
| 2004/0125787 A1* | 7/2004 | May | .................. | H04L 7/041 370/503 |
| 2005/0058090 A1* | 3/2005 | Chang | .................. | H04L 12/66 370/312 |
| 2005/0094637 A1* | 5/2005 | Umesawa | .................. | H04L 41/0893 370/389 |
| 2005/0138352 A1* | 6/2005 | Gauvreau | .................. | H04L 9/3247 713/153 |
| 2005/0219084 A1* | 10/2005 | Dietrich | .................. | H03M 9/00 341/101 |
| 2006/0041742 A1* | 2/2006 | Oba | .................. | H04W 12/03 713/151 |
| 2006/0178150 A1* | 8/2006 | Kim | .................. | H04W 40/08 455/445 |
| 2006/0227811 A1* | 10/2006 | Hussain | .................. | H04L 49/90 370/503 |
| 2006/0259583 A1* | 11/2006 | Matsuura | .................. | H04L 61/256 709/218 |
| 2007/0018708 A1* | 1/2007 | Yoo | .................. | H04L 47/10 327/261 |
| 2007/0019552 A1* | 1/2007 | Senarath | .................. | H04W 8/04 370/235 |
| 2007/0038855 A1* | 2/2007 | Brown | .................. | H04L 63/08 713/161 |
| 2007/0110087 A1* | 5/2007 | Abel | .................. | H04L 45/62 370/461 |
| 2007/0115821 A1* | 5/2007 | Sim | .................. | H04L 1/1664 370/231 |
| 2007/0142005 A1* | 6/2007 | Sundstrom | .................. | H03C 5/00 455/116 |
| 2007/0189486 A1* | 8/2007 | Ise | .................. | H04L 61/256 379/201.12 |
| 2007/0195819 A1* | 8/2007 | Chen | .................. | H04L 1/0002 370/468 |
| 2007/0208836 A1* | 9/2007 | Madnani | .................. | G06F 3/0637 709/223 |
| 2007/0242702 A1* | 10/2007 | Shim | .................. | H04W 24/08 370/516 |
| 2008/0010565 A1* | 1/2008 | Jeng | .................. | H04L 69/323 714/700 |
| 2008/0028210 A1* | 1/2008 | Asano | .................. | H04L 63/0485 713/161 |
| 2008/0112440 A1* | 5/2008 | Bedekar | .................. | H04W 56/0045 370/519 |
| 2008/0137542 A1* | 6/2008 | Chiu | .................. | H04L 63/1425 370/242 |
| 2008/0225746 A1* | 9/2008 | Bedrosian | .................. | H04L 43/50 370/252 |
| 2008/0225747 A1* | 9/2008 | Bedrosian | .................. | H04L 41/145 370/252 |
| 2008/0279189 A1* | 11/2008 | Smith | .................. | H04L 49/9094 370/394 |
| 2008/0320582 A1* | 12/2008 | Chen | .................. | H04L 63/105 726/12 |
| 2009/0116426 A1* | 5/2009 | Ho | .................. | H04L 47/28 370/328 |
| 2009/0161744 A1* | 6/2009 | Smith | .................. | H04L 1/205 375/226 |
| 2009/0190482 A1* | 7/2009 | Blair | .................. | H04L 45/12 370/250 |
| 2009/0259445 A1* | 10/2009 | Bedrosian | .................. | H04L 43/50 703/2 |
| 2009/0259712 A1* | 10/2009 | Sugawara | .................. | H04L 43/0852 709/224 |
| 2009/0323687 A1* | 12/2009 | Nishimura | .................. | H04L 45/36 370/389 |
| 2010/0058148 A1* | 3/2010 | Lu | .................. | H03M 13/6306 714/776 |
| 2010/0085886 A1* | 4/2010 | Okada | .................. | H04L 43/0852 370/252 |
| 2010/0103946 A1* | 4/2010 | Nomura | .................. | H04L 43/0852 370/412 |
| 2010/0110892 A1* | 5/2010 | Lai | .................. | H04L 47/10 370/235 |
| 2010/0124178 A1* | 5/2010 | Baccelli | .................. | H04W 52/286 370/252 |
| 2010/0172453 A1* | 7/2010 | Cankaya | .................. | H04W 56/0015 370/328 |
| 2010/0260204 A1* | 10/2010 | Pepper | .................. | H04L 43/106 370/474 |
| 2011/0037904 A1* | 2/2011 | Yokokawa | .................. | H04N 21/4346 375/316 |
| 2011/0110375 A1* | 5/2011 | Boucadair | .................. | H04L 61/6004 370/393 |
| 2011/0164625 A1* | 7/2011 | Fourcand | .................. | H04J 3/0667 370/498 |
| 2011/0211593 A1* | 9/2011 | Pepper | .................. | H04L 43/028 370/474 |
| 2011/0238817 A1* | 9/2011 | Okita | .................. | H04L 41/142 709/224 |
| 2011/0294539 A1* | 12/2011 | Shin | .................. | H04W 48/18 455/552.1 |
| 2011/0314269 A1* | 12/2011 | Stavrou | .................. | G06F 21/6209 713/150 |
| 2012/0039194 A1* | 2/2012 | Kure | .................. | H04N 19/30 375/259 |
| 2012/0063339 A1* | 3/2012 | Song | .................. | H04L 47/28 370/252 |
| 2012/0216192 A1* | 8/2012 | Tsai | .................. | G06F 9/45545 718/1 |
| 2012/0233461 A1* | 9/2012 | Takahashi | .................. | H04L 9/3271 713/168 |
| 2012/0269093 A1* | 10/2012 | Grammel | .................. | H04L 41/12 370/254 |
| 2013/0080817 A1* | 3/2013 | Mihelic | .................. | H04L 43/0852 713/401 |
| 2013/0114448 A1* | 5/2013 | Koo | .................. | H04W 24/00 370/252 |
| 2013/0198546 A1* | 8/2013 | Fujisawa | .................. | G06F 1/3287 713/323 |
| 2013/0315241 A1* | 11/2013 | Kamat | .................. | H04L 69/24 370/392 |
| 2013/0329585 A1* | 12/2013 | Okada | .................. | H04W 24/00 370/252 |

(56) References Cited

U.S. PATENT DOCUMENTS

| | | | |
|---|---|---|---|
| 2013/0343747 A1* | 12/2013 | Sarwar | H04L 45/121 370/252 |
| 2014/0036695 A1* | 2/2014 | Ziegler | H04L 49/901 370/252 |
| 2014/0050002 A1* | 2/2014 | Sun | G11C 15/00 365/49.1 |
| 2014/0153572 A1* | 6/2014 | Hampel | H04L 45/64 370/392 |
| 2014/0160952 A1* | 6/2014 | Astigarraga | H04L 43/10 370/252 |
| 2014/0181893 A1* | 6/2014 | Von Bokern | H04L 9/3234 726/1 |
| 2014/0215642 A1* | 7/2014 | Huxham | G06Q 20/3223 726/28 |
| 2014/0269372 A1* | 9/2014 | Roy | H04L 43/0858 370/252 |
| 2015/0023189 A1* | 1/2015 | Okada | H04L 41/5009 370/252 |
| 2015/0085877 A1* | 3/2015 | Kono | H04L 49/208 370/467 |
| 2015/0124611 A1* | 5/2015 | Attar | H04L 47/283 370/235 |
| 2015/0131450 A1* | 5/2015 | Weill | H04L 43/0864 370/237 |
| 2015/0236957 A1* | 8/2015 | Albanese | H04L 12/6418 370/235 |
| 2015/0244634 A1* | 8/2015 | Azogui | H04L 47/263 370/231 |
| 2016/0065655 A1* | 3/2016 | Bentley | G16H 20/30 709/201 |
| 2016/0112336 A1* | 4/2016 | Hong | H04L 43/16 370/230 |
| 2016/0315841 A1* | 10/2016 | Kang | H04L 47/283 |
| 2016/0315860 A1* | 10/2016 | Nichols | H04L 25/03859 |
| 2017/0048076 A1* | 2/2017 | Li | H04L 12/185 |
| 2017/0171226 A1* | 6/2017 | Watkins | H04L 43/04 |
| 2017/0230310 A1* | 8/2017 | Takeuchi | H04L 1/0042 |
| 2017/0295099 A1* | 10/2017 | Murphy | H04L 45/123 |
| 2018/0115478 A1* | 4/2018 | Kim | H04L 43/106 |
| 2018/0145781 A1* | 5/2018 | Chaloupka | H04J 3/0644 |
| 2018/0176144 A1* | 6/2018 | Luo | H04L 47/56 |
| 2018/0198616 A1* | 7/2018 | Feather | H04L 9/3263 |
| 2018/0288129 A1* | 10/2018 | Joshi | H04L 43/08 |
| 2018/0309689 A1* | 10/2018 | Nainar | H04L 47/2408 |
| 2018/0337945 A1* | 11/2018 | Takabe | H04L 43/16 |
| 2019/0107415 A1* | 4/2019 | Fumey | G06F 11/0724 |
| 2019/0109822 A1* | 4/2019 | Clark | H04L 63/0428 |
| 2019/0110196 A1* | 4/2019 | Simileysky | H04W 4/80 |
| 2019/0363990 A1* | 11/2019 | Lorenz | H04L 45/38 |
| 2019/0372403 A1* | 12/2019 | Park | H04B 5/0075 |
| 2019/0373041 A1* | 12/2019 | Lee | H04L 47/25 |
| 2020/0007548 A1* | 1/2020 | Sanghavi | H04L 63/0209 |
| 2020/0021558 A1* | 1/2020 | Xu | H04L 12/4679 |
| 2020/0052979 A1* | 2/2020 | Clemm | H04L 41/5019 |
| 2020/0068446 A1* | 2/2020 | Nimbavikar | H04L 47/20 |
| 2020/0077440 A1* | 3/2020 | Lee | H04W 74/04 |
| 2020/0106710 A1* | 4/2020 | Ryoo | H04L 49/252 |
| 2020/0127808 A1* | 4/2020 | Takahashi | H04N 21/4302 |
| 2020/0220812 A1* | 7/2020 | Butcher | H04L 45/566 |
| 2020/0228496 A1* | 7/2020 | Mori | H04L 63/101 |
| 2020/0228515 A1* | 7/2020 | Hassan | H04L 9/3226 |
| 2020/0322245 A1* | 10/2020 | Ansah | H04L 41/0806 |
| 2020/0322378 A1* | 10/2020 | Yang | G06K 9/6297 |
| 2020/0374955 A1* | 11/2020 | Dudda | H04W 76/15 |
| 2020/0389436 A1* | 12/2020 | Go | H04L 61/103 |
| 2021/0058369 A1* | 2/2021 | Hillis | H04L 63/08 |
| 2021/0075797 A1* | 3/2021 | Gan | G06F 9/5077 |
| 2021/0194876 A1* | 6/2021 | Kasahara | H04B 7/15 |
| 2021/0203412 A1* | 7/2021 | Whitefield | H04B 7/18519 |
| 2022/0255840 A1* | 8/2022 | Mori | H04L 45/42 |

* cited by examiner

AUTHENTICATING COMPUTING DEVICES BASED ON A DYNAMIC PORT PUNCHING SEQUENCE

BACKGROUND

Cybersecurity may involve the authentication of a computing device, preventing access of a computing device by an unauthorized party, and further, to prevent two computing devices from communicating with each other unless authorized to do so. Such cybersecurity measures may be employed in an aircraft to prevent unauthorized access to avionics control systems. Aircrafts may also employ physical security measures, such as barriers to prevent access to secure avionics systems. Such avionics systems may control the functions and features available on an aircraft. In the event features and functions of the aircraft are added or removed, recertification of the aircraft may be required to verify compliance of the aircraft's physical and cybersecurity against security requirements.

SUMMARY

In one example aspect, a computer-implemented method includes: receiving, by an authentication device, from a client device and via a network device, a plurality of passcode packets as part of a request to be authenticated by the authentication device; recording, by the authentication device, a sequence of port identifiers corresponding to respective ports of the network device via which the plurality of passcode packets are received; and authenticating, by the authentication device, the client device based on the sequence of port identifiers.

In another example aspect, a computer program product includes a computer readable storage medium having program instructions embodied therewith. The program instructions are executable by a computing device to cause the computing device to perform operations including: receiving, from a client device and via a network device, a plurality of passcode packets as part of a request to be authenticated by the authentication device; recording a sequence of respective transmission delay durations between the transmission of the plurality of the passcode packets; and authenticating the client device based on the sequence of transmission delay durations.

In another example aspect, a system includes a processor, a computer readable memory, a non-transitory computer readable storage medium associated with a computing device, and program instructions executable by the computing device to cause the computing device to perform operations comprising: receiving, from a client device and via a network device, a plurality of passcode packets as part of a request to be authenticated by the authentication device; recording a sequence of respective transmission delay durations between the transmission of the plurality of the passcode packets; recording a sequence of port identifiers corresponding to respective ports of the network device via which the plurality of passcode packets are received; and authenticating the client device based on the sequence of transmission delay durations and the sequence of port identifiers.

DETAILED DESCRIPTION

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Cybersecurity may involve authenticating a computing device, preventing access of a computing device by an unauthorized party, and further, to prevent two computing devices from communicating with each other unless authorized to do so. As one illustrative example, such cybersecurity measures may be employed in an aircraft to prevent unauthorized access to avionics control systems. However, avionics control systems may still be exposed to insider threats, and/or other types of techniques whereby an unauthorized party may gain access to the avionics control system, or other type of system. Further, to modify a feature or function available for use on the aircraft, a lengthy, time consuming, and possibly bureaucratic recertification process may be required. Accordingly, aspects of the present disclosure may include a system and/or method to improve authentication of a client device, thereby improving the secure access of a host device by a client device based on verifying a dynamic "port punching" sequence. As described herein, dynamic port punching may include receiving and verifying "passcode packets" from the client device via a network device through a series of ports. The sequence of the ports from which these packets are received may be recorded, as well as the time delay between the receipt of the packets. Further, signatures and payload values within the packet may be verified to match expected signatures and payload known only to authorized parties. If the sequence, time delay, signatures, and/or payload match preconfigured values, a client device may be authenticated and a secure session may be established between the client device and the host device. From this secure session, the client device may securely communicate with the host device for any variety of purposes.

As one illustrative example, aspects of the present disclosure may authenticate a client device and secure the access by a client device to an avionics control system in in order to enable or disable features and functions on an aircraft remotely. Such features may include those that have been pre-certified previously (e.g., without requiring additional recertification). That is, aspects of the present disclosure may be used to securely enable or disable aircraft features remotely in connection with a service level agreement (SLA). Additionally, or alternatively, aspects of the present disclosure may be used to securely enable or disable aircraft features as part of incident response. Example features may include features relating to weather forecasting along flight routes, automated flight service features, enroute automation features, flight management/planning features, user evaluation features, wind shear detection features, etc. As another illustrative example, aspects of the present disclosure may secure the access of an avionics control system to obtain records, or data from a flight log, or other system.

The techniques described herein are not so limited to being used in in avionics systems. Rather, the techniques described herein may be used to authorize the communications between two devices in any environment for any variety applications or systems. For example, aspects of the present disclosure may be used to establish secure communications between a client device and a host device that hosts banking applications, financial applications, enterprise data, sensor data, etc.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

Figure 1:
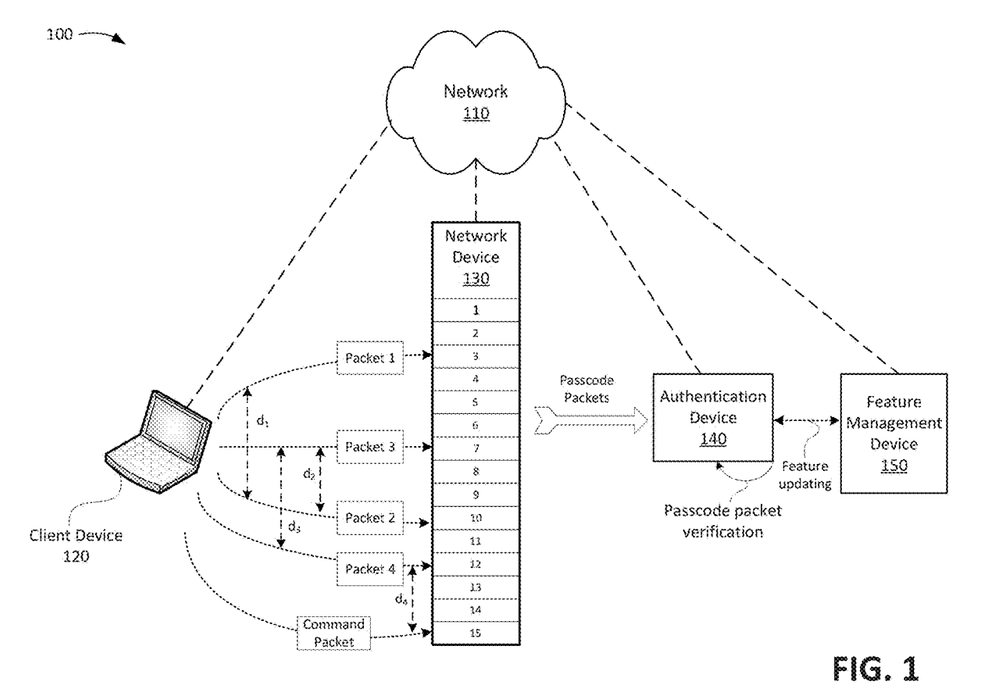
FIG. 1 illustrates an example environment and overview in accordance with aspects of the present disclosure.

FIG. 1 illustrates an example environment and overview in accordance with aspects of the present disclosure. As shown in FIG. 1, environment 100 includes a network 110, a client device 120, a network device 130, an authentication device 140, and a feature management device 150.

The network 110 may include network nodes and one or more wired and/or wireless networks. For example, the network 110 may include a cellular network (e.g., a second generation (1G) network, a third generation (3G) network, a fourth generation (4G) network, a fifth generation (1G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 110 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 110 may include copper transmission cables, optical transmission fibers, wireless transmission, routers, firewalls, switches, gateway computers and/or edge servers.

The client device 120 may include a computing device capable of communicating via a network, such as the network 110. In example embodiments, the client device 120 corresponds to a mobile communication device (e.g., a smart phone or a personal digital assistant (PDA)), a portable computer device (e.g., a laptop or a tablet computer), a desktop computer, a server computer, and/or another type of computing device. In some embodiments, the client device 120 may request access to a host device (e.g., the authentication device 140) via the network device 130. For example, the client device 120 may request the authentication device 140 to update a feature implemented and/or hosted by the feature management device 150. As described in greater detail herein, the authentication device 140 may authorize the request based on verifying a dynamic port punch sequence.

The network device 130 may include one or more network communication devices, such as switches, hubs, routers, modems, access points, or the like. In some embodiments, the network device 130 may incorporate any number of physical or virtual ports via which data may be received and transmitted. In the context of one or more embodiments described herein, the network device 130 may receive passcode packets from the client device 120 via specific ports, and provide the passcode packets to the authentication device 140.

The authentication device 140 may include one or more computing devices that receives passcode packets from the client device 120 as part of a request to be authenticated (e.g., to communicate and/or establish a secure session between the client device 120 and the authentication device 140). In some embodiments, the authentication device 140 may verify the passcode packets or dynamic port punching (e.g., the sequence of the ports via which the packets are received, the duration delay between the transmission of the packets, the signature of the packet, and/or the payload of the packets). Based on verifying the passcode packets as described herein, the authentication device 140 may authenticate the client device 120 and/or establish a secure session with the client device 120 for secure communications. That is, the authentication device 140 may also function as a host device in a client/host relationship with the client device 120. In the example of FIG. 1, the secure communications may include a request to update features provided by the feature management device 150.

The feature management device 150 may include one or more computing devices that's hosts or implements an application, or feature in an external system. As one example, the feature management device 150 may be part of an avionics controls system that hosts one or more applications, functions, and/or features of an aircraft. In some embodiments, the feature management device 150 may update (e.g., enable or disable) the features based on receiving an instruction from the authentication device 140.

The quantity of devices and/or networks in the environment 100 is not limited to what is shown in FIG. 1. In practice, the environment 100 may include additional devices and/or networks; fewer devices and/or networks; different devices and/or networks; or differently arranged devices and/or networks than illustrated in FIG. 1. Also, in some implementations, one or more of the devices of the environment 100 may perform one or more functions described as being performed by another one or more of the devices of the environment 100. Devices of the environment 100 may interconnect via wired connections, wireless connections, or a combination of wired and wireless connections.

As further shown in FIG. 1, the client device 120 may provide a request to access and establish a secure session with a host device (e.g., the authentication device 140). As part of this request, the client device 120 may provide a set of passcode packets via ports in a particular sequence and with delays between the transmission of each passcode packet. In the example shown in FIG. 1, the client device 120 may provide the passcode packets 1, 2, 3, and 4 via ports 3, 10, 7, and 12 in this sequence. Following the passcode packets, the client device 120 may provide a command packet via port 15. The client device may provide the packets with a transmission delay between packets 1 and 2, packets 2 and 3, packets 3 and 4, and packet 4 and the command packet of $d_1$, $d_2$, $d_3$, and $d_4$ respectively. Example delays may be 1 millisecond to 100 millisecond, although any duration of delays may be used. Each of the packets may include a signature and a payload.

The authentication device 140 may receive these passcode packets, and verify the passcode packets. More specifically, the authentication device 140 may verify the port punch sequence (e.g., the sequence of ports via which the passcode packets are transmitted), the transmission delays, the signature values within each passcode, the payload values within each passcode packet, and/or any other information that indicates that the client device 120 is authorized to communicate with the authentication device 140. Based on verifying the passcode packets, the authentication device 140 may establish a secure session with the client device 120. In the example of FIG. 1, the authentication device 140 may receive the command packet as part of the secure session, or alternatively, may receive the command packet as part of the initial request to communicate with the authentication device 140. In either case, the authentication device 140 may, after performing passcode packet verification as described above, may execute the command packet by updating the features hosted by the feature management device 150 in accordance with the instructions included in the command packet. In brief, the authentication device 140 may authenticate that the instructions from the command packet are from an authorized source by performing the passcode packet verification. Upon verification, the authentication device 140 may execute the instructions in the command packet, which, as one example, may include updating the features hosted by the feature management device 150.

In some embodiments, the authentication information (e.g., the port punch sequence, transmission delays, signature values, payload values, etc.) may be preconfigured and stored by the authentication device 140. As described herein, any variety of secure information dissemination techniques may be used to provide and/or disseminate authorized devices, such as the client device 120, with the authentication information related to the port punch sequence, transmission delays, signature values, payload values, etc. For example, the authentication information may be stored in a secure location, encrypted, etc. Additionally, or alternatively, both the client device 120 and the authentication device 140 may use a common time-based algorithm to determine the port punch sequence and/or transmission delays. Additionally, or alternatively, any other techniques and measures may be taken to securely safeguard the authentication information for distribution only to authorized devices and parties. As such, the host device (e.g., the authentication device 140) may authenticate a client device (e.g., the client device 120) based on verifying the port punch sequence, transmission delays, signature values, payload values, and/or any other data. The use of such multiple different parameters provides additional layers of security for accessing a host device.

Figure 2A:
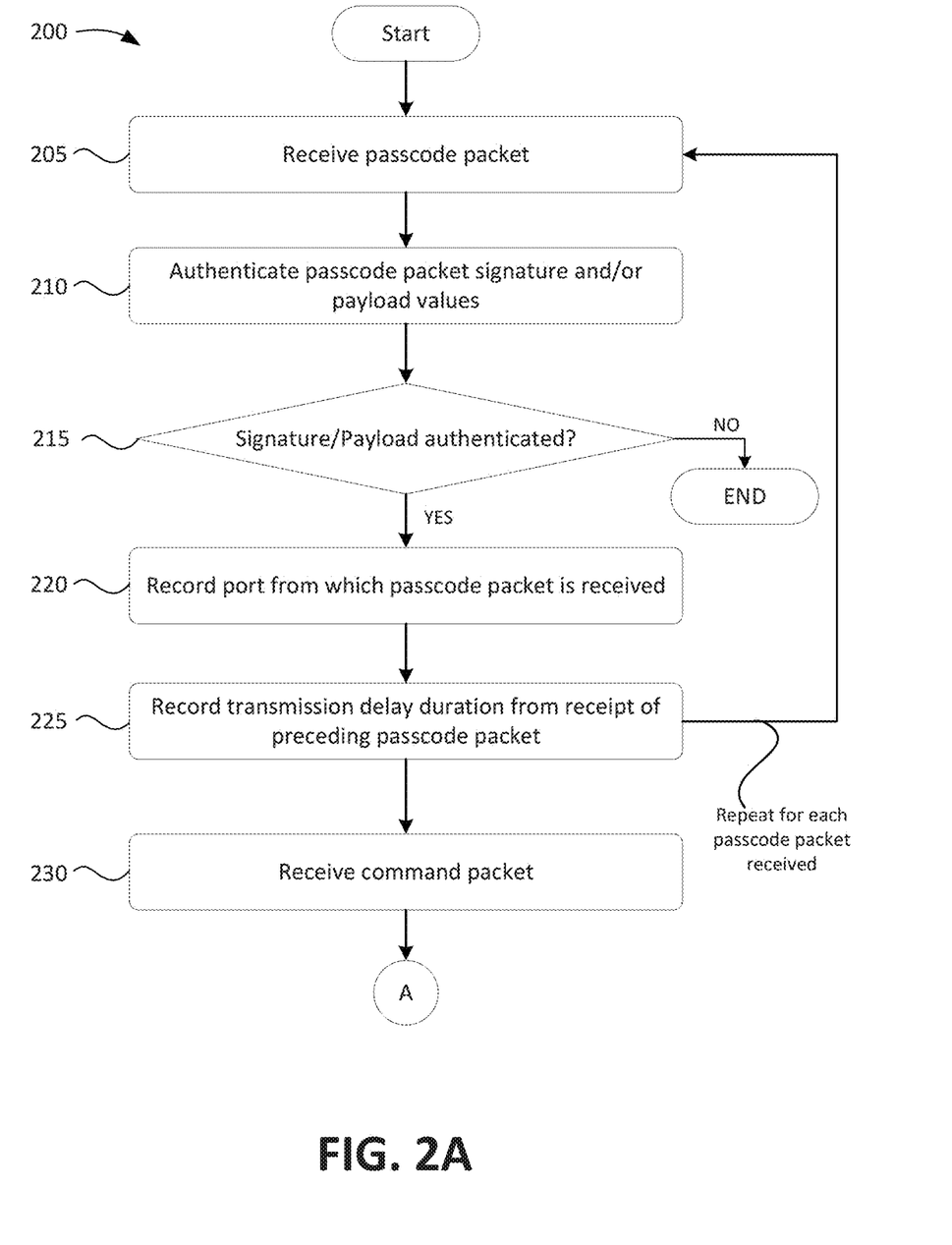
FIG. 2A illustrates an example flowchart of a process for establishing a secure session between a client device and a host device based on port punching verification in accordance with aspects of the present disclosure.
Figure 2B:
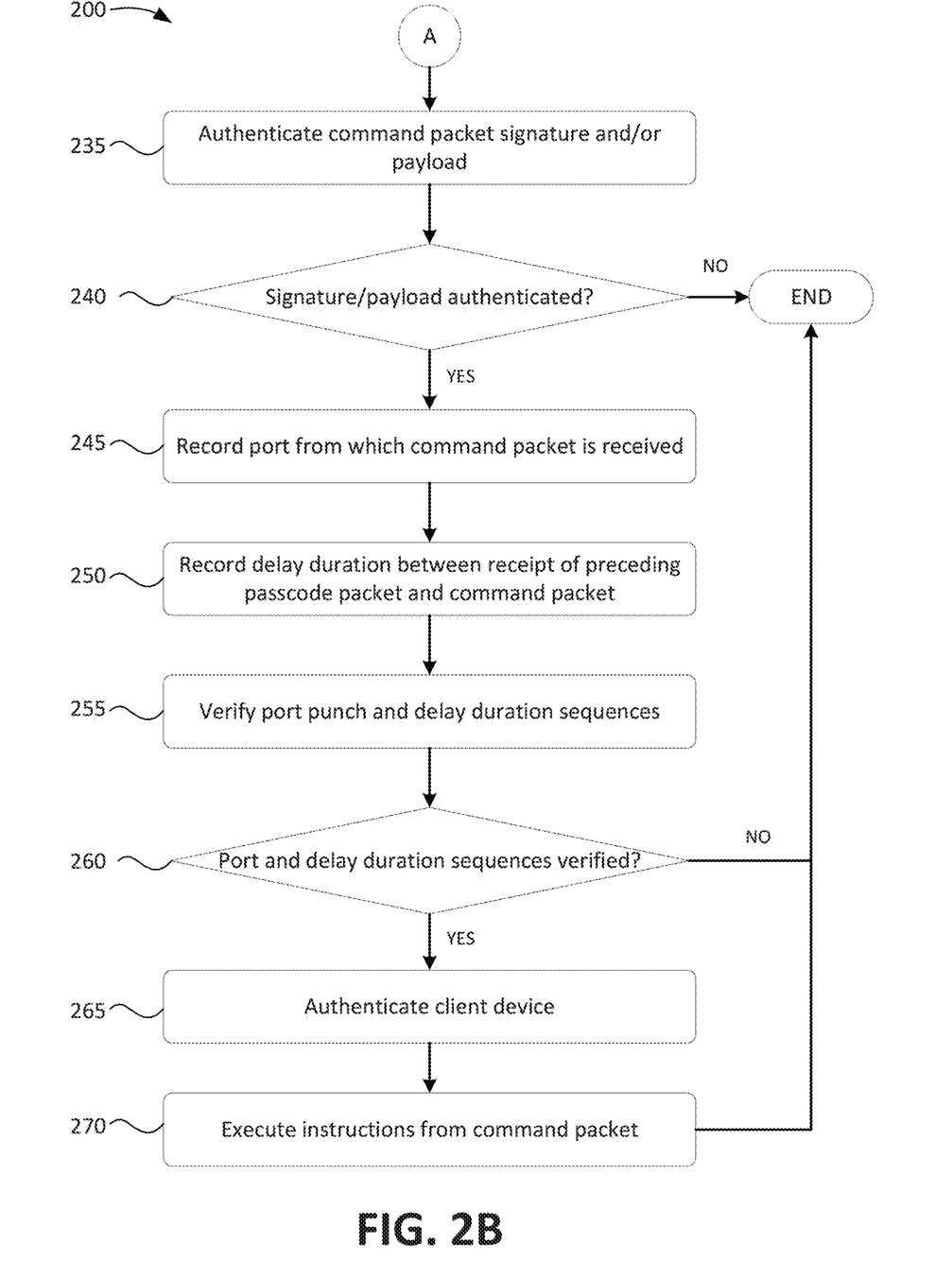
FIG. 2B illustrates an example flowchart of a process for establishing a secure session between a client device and a host device based on port punching verification in accordance with aspects of the present disclosure.

FIGS. 2A and 2B illustrate an example flowchart of a process for establishing a secure session between a client device and a host device based on port punching verification in accordance with aspects of the present disclosure. The blocks of FIGS. 2A and 2B may be implemented in the environment of FIG. 1, for example, and are described using reference numbers of elements depicted in FIG. 1. The flowchart illustrates the architecture, functionality, and operation of possible implementations of systems, methods, and computer program products according to various embodiments of the present disclosure.

As shown in FIG. 2A, process 200 may include receiving passcode packet (block 205). For example, the authentication device 140 may receive a passcode packet from the client device 120 as part of a request to be authenticated by the authentication device 140 (e.g., to update an available feature). As described herein, the passcode packet may be received via a particular port of the network device 130, and may include a signature and/or payload value.

Process 200 also may include authenticating passcode packet signature and/or payload values (block 210). For example, the authentication device 140 may authenticate passcode packet signature and/or payload values by comparing the signature and/or payload values within the passcode packet with values that are considered to be authenticated. In some embodiments, the passcode packet may include a private key and the authentication device 140 may apply a public decryption key to decrypt the signature and/or payload values.

Process 200 further may include determining whether the signature and/or payload values are authenticated (block 215). For example, the authentication device 140 may determine whether the signature and/or payload values are authenticated as described in block 210. Unauthenticated signature and/or payload values may indicate that an authorized party may be attempting to access the authentication device 140. Thus, if signature and/or payload values are not authenticated (block 215—NO), process 200 may end, without access being granted to the client device 120.

If, on the other hand, the signature and/or payload values are authenticated (block 215—YES), process 200 also may include recording the port from which the passcode packet is received (block 220). For example, the authentication device 140 may record an identifier of the port from which the passcode packet is received (e.g., the port of network device 130 via which the passcode packet is received, as may be found in a session request log, or the like).

Process 200 further may include recording the transmission delay duration from the receipt of a preceding passcode packet (block 225). For example, the authentication device 140 may record the transmission delay duration from the receipt of a preceding passcode packet. In some embodiments, the authentication device 140 may determine the delay duration based on a session log that identifies a time when each passcode packet is received. Process 200 may then return to block 205 in which blocks 205-225 are repeated for each passcode packet received from the client device 120. If the passcode packet is the first received passcode packet, block 225 may be omitted. In this way, the authentication device 140 may authenticate each packet against its signature and/or payload values to verify that each packet is received from an authorized client device 120. Further, each port from which the packets are received may be recorded as part of a port punch sequence. Additionally, the transmission delay between the transmission of each packet may be recorded. As described in greater detail herein, the recorded port and transmission delay sequences may be used to authenticate the client device 120.

Process 200 also may include receiving a command packet (block 230). For example, the authentication device 140 may receive a command packet from the client device 120 (e.g., after all passcode packets have been received). In some embodiments, the command packet may include a command instruction or request for the authentication device 140. As one illustrative example, the command packet may include an instruction or request for the authentication device 140 to enable or disable one or more features, applications, or functions, hosted by the feature management device 150, available for use on an aircraft. In some embodiments, the command packet may further include a signature and/or payload values to authenticate the client device 120.

Referring to FIG. 2B, process 200 also may include authenticate the command packet signature and/or payload (block 235). For example, the authentication device 140 may authenticate the command packet signature and/or payload (e.g., in a similar manner as authenticating the passcode packet signature and/or payload as described at process block 210).

Process 200 also may include determining whether the signature and/or payload is authenticated (block 240). For example, the authentication device 140 may verify whether the signature and/or payload values from the command packet are authenticated (e.g., by comparing the signature and/or payload values within the command packet with values that are considered to be authenticated). If the signature and/or payload values are not authenticated (block 240—NO), process 200 may end, thereby preventing unauthorized commands from being executed.

If, on the other hand, the signature and/or payload values from the command packet are authenticated (block 240—YES), process 200 further may include recording the port from which the command packet is received (block 245). For example, the authentication device 140 may record an identifier of the port from which the command packet is received (e.g., the port of network device 130 via which the command packet is received, as may be found in a session request log, or the like).

Process 200 also may include recording the delay duration between the receipt of the preceding passcode packet and the command packet (block 250). For example, the authentication device 140 may record the delay duration between the receipt of the preceding passcode packet and the command packet (e.g., based on a session log that identifies times in which the preceding passcode packet and the command packet are received).

Process 200 further may include verifying a port punch and delay duration sequences (block 255). For example, the authentication device 140 may verify a port punch and delay duration sequences based on the recorded ports from which the passcode and command packets are received (e.g., from blocks 220 and 250). Further, the authentication device 140 may verify the delay duration sequence between the received passcode and command packets (e.g., recorded at blocks 225 and 255). In some embodiments, the authentication device 140 may verify the port punch and delay duration sequences against preconfigured and/or stored port punch and delay duration sequences known only to authorized devices. As such, the port punch and delay duration sequences may be verified when the passcode and/or command packets are received by an authorized client device 120 that has knowledge of the correct port punch and/or delay duration sequence.

If, for example, the port punch and delay duration sequences are not verified (block 260—NO), process 200 may end, thereby preventing a command from an unauthorized client device 120 to be executed, or prevent the client device 120 and the authentication device 140 from further communicating. If, on the other hand, the port punch and delay duration sequences are verified (block 260—YES), process 200 may include authenticating the client device (block 265). For example, the authentication device 140 may authenticate the client device 120 by establishing a secure session with the client device 120, storing information indicating that the client device is authenticated, etc.

Process 200 may further include executing instructions from the command packet (block 270). For example, the authentication device 140 may execute the instructions included in the command packet. As one illustrative example, the authentication device 140 may execute the instructions to enable or disable one or more features, applications, or functions, hosted by the feature management device 150, available for use on an aircraft. As another illustrative example, the authentication device 140 may execute the instructions to provide the client device 120 with activity logs, sensor logs, etc.

In some embodiments, one or more process blocks of 200 may be modified, rearranged, or omitted. For example, blocks 230-250 may be omitted and block 270 may be modified in which a secure communications session is established between the client device 120 and the authentication device 140 based on verifying the port punch sequence and delay duration sequence of the passcode packets (e.g., without a command packet). In an alternative embodiment, the authentication device 140 may authenticate a client device 120 based only either on the port punch sequence or the delay duration sequence. Once a secure session is established, the client device 120 and authentication device 140 may communicate with each other for any variety of purposes, such as to exchange data (e.g., from sensor logs, activity logs, etc.), send/receive commands, perform API calls, process data for an application, or the like. That is to say, the authentication of the client device 120 may permit the client device 120 to perform any of the aforementioned tasks. Additionally, or alternatively, the authentication device 140 may provide an indication to an external system that the client device 120 is authenticated to allow communication between the client device 120 and the external system, or to allow the external system to execute a process involving the client device 120. In other words, process 200 may be used, in a broad sense, to authenticate the client device 120 for a variety of purposes in which the authentication is based on the port punch sequence and/or the delay duration sequence which is known to authorized client devices 120. As an additional layer of security, the signatures and/or payload values within the received packets may be verified against the values known to authorized client devices 120.

Figure 3:
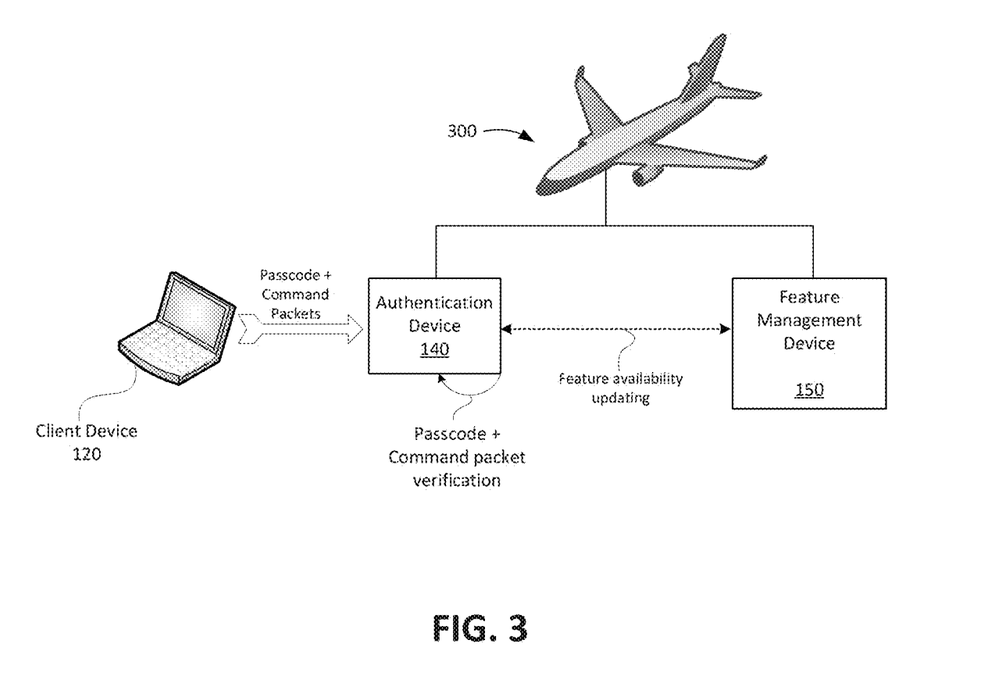
FIG. 3 illustrates an example implementation for remotely updating features, hosted by a feature host device, and available for use in an aircraft.

FIG. 3 illustrates an example implementation for remotely updating features, hosted by a feature host device, and available for use in an aircraft. As shown in FIG. 3, a client device 120 may provide (e.g., to the authentication device 140 via the network device 130) passcode and command packets as part of a request to update features available on an aircraft 300. The authentication device 140 may verify the passcode and command packets as described above with respect to process 200 of FIGS. 2A and 2B. More specifically, the authentication device 140 may verify the port punch sequence and/or the duration delay sequence. Based on verifying the port punch sequence and/or the duration delay sequence, the authentication device 140 may execute the instructions in the command packet, such as instructions to update features hosted by the feature management device 150. Example features that may be enabled or disabled may include features relating to weather forecasting along flight routes, automated flight service features, en-route automation features, flight management/planning features, user evaluation features, wind shear detection features, etc.

Figure 4:
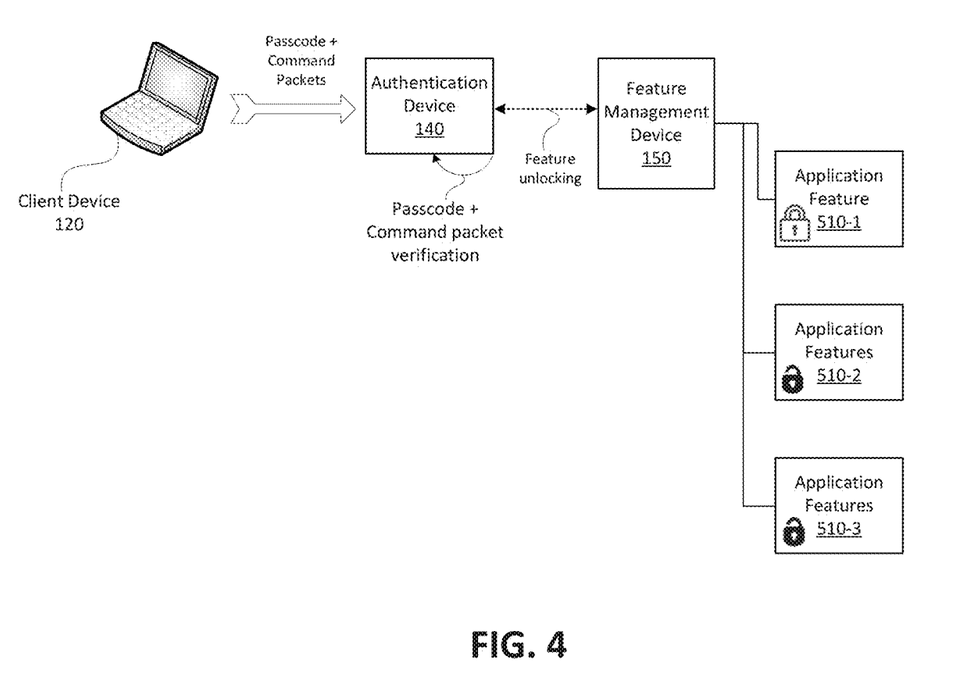
FIG. 4 illustrates an example implementation for updating features, hosted by a feature host device, available within an application.

FIG. 4 illustrates an example implementation for updating features, hosted by a feature host device, available within an application. As shown in FIG. 4, a client device 120 may provide (e.g., to the authentication device 140 via the network device 130) passcode and command packets as part of a request to update features available as part of an application hosted by the feature management device 150. The authentication device 140 may verify the passcode and command packets as described above with respect to process 200 of FIGS. 2A and 2B. More specifically, the authentication device 140 may verify the port punch sequence and/or the duration delay sequence. Based on verifying the port punch sequence and/or the duration delay sequence, the authentication device 140 may execute the instructions in the command packet, such as instructions to update features (e.g., lock or unlock features) hosted by the feature management device 150. In the example shown, Application Feature 510-1 may be locked, and Application Features 510-2 and 510-3 may be unlocked in accordance with the instructions in the command packet. Any variety of application features may be locked or unlocked in connection with an SLA, subscription agreement, or the like. In one example embodiment, application features may be related to premium content or features available for subscribers or may be unlocked upon purchase.

Figure 5:
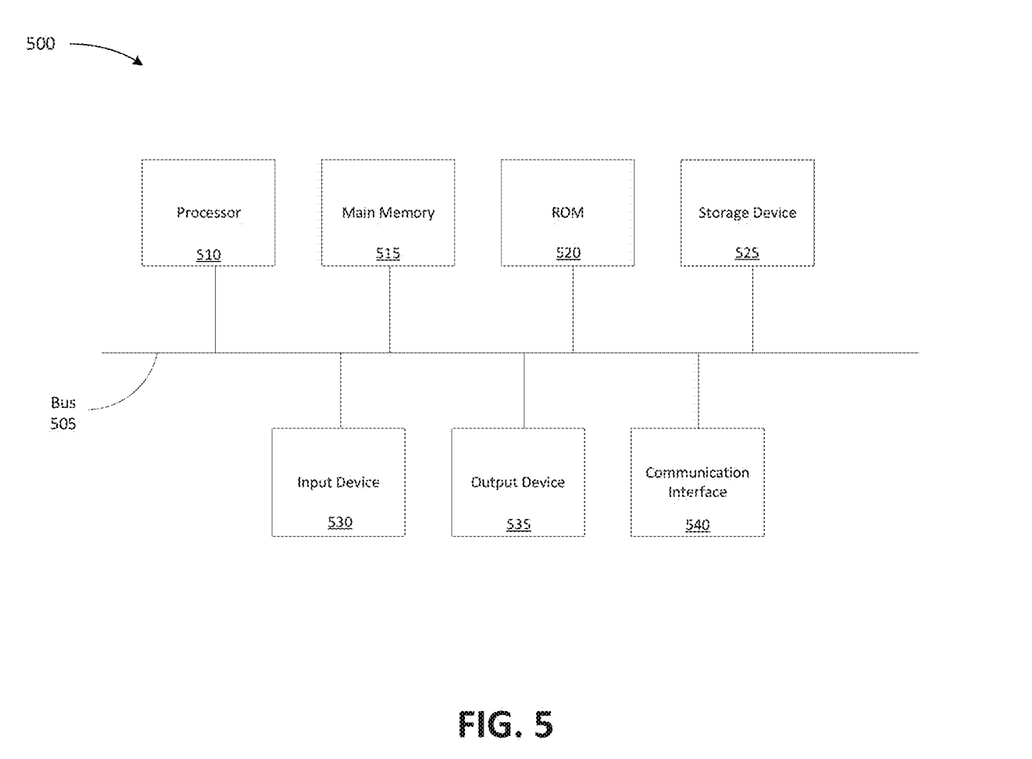
FIG. 5 illustrates example components of a device that may be used within environment of FIG. 1.

FIG. 5 illustrates example components of a device 500 that may be used within environment 100 of FIG. 1. Device 500 may correspond to the client device 120, the network device 130, the authentication device 140, and/or the feature management device 150. Each of client device 120, the network device 130, the authentication device 140, and/or the feature management device 150 may include one or more devices 500 and/or one or more components of device 500.

As shown in FIG. 5, device 500 may include a bus 505, a processor 510, a main memory 515, a read only memory (ROM) 520, a storage device 525, an input device 530, an output device 535, and a communication interface 540.

Bus 505 may include a path that permits communication among the components of device 500. Processor 510 may include a processor, a microprocessor, an application specific integrated circuit (ASIC), a field programmable gate array (FPGA), or another type of processor that interprets and executes instructions. Main memory 515 may include a random access memory (RAM) or another type of dynamic storage device that stores information or instructions for execution by processor 510. ROM 520 may include a ROM device or another type of static storage device that stores static information or instructions for use by processor 510. Storage device 525 may include a magnetic storage medium, such as a hard disk drive, or a removable memory, such as a flash memory.

Input device 530 may include a component that permits an operator to input information to device 500, such as a control button, a keyboard, a keypad, or another type of input device. Output device 535 may include a component that outputs information to the operator, such as a light emitting diode (LED), a display, or another type of output device. Communication interface 540 may include any transceiver-like component that enables device 500 to communicate with other devices or networks. In some implementations, communication interface 540 may include a wireless interface, a wired interface, or a combination of a wireless interface and a wired interface. In embodiments, communication interface 540 may receiver computer readable program instructions from a network and may forward the computer readable program instructions for storage in a computer readable storage medium (e.g., storage device 525).

Device 500 may perform certain operations, as described in detail below. Device 500 may perform these operations in response to processor 510 executing software instructions contained in a computer-readable medium, such as main memory 515. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 515 from another computer-readable medium, such as storage device 525, or from another device via communication interface 540. The software instructions contained in main memory 515 may direct processor 510 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 500 may include additional components, fewer components, different components, or differently arranged components than are shown in FIG. 5.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
   receiving, by an authentication device, from a client device and via a network device, a plurality of passcode packets as part of a request to be authenticated by the authentication device;
   recording, by the authentication device, a sequence of port identifiers corresponding to respective ports of the network device via which the plurality of passcode packets is received and a plurality of respective transmission delay durations between the transmission of the plurality of the passcode packets; and
   authenticating, by the authentication device, the client device based on verifying the sequence of port identifiers against a predetermined sequence of port identifiers and verifying the plurality of transmission delay durations against a plurality of delay durations predetermined to be provided by the client device between the transmission of the plurality of the passcode packets, wherein the plurality of delay durations comprise a plurality of different delay durations.

2. The computer-implemented method of claim 1, wherein the authenticating is further based on authenticating a signature or payload value within at least one of the plurality of passcode packets.

3. The computer-implemented method of claim 1, further comprising updating a feature available in an avionics system based on the authenticating.

4. The method of claim 3, wherein the updating the feature comprises one of enabling or disabling the feature.

5. The computer-implemented method of claim 1, further comprising establishing a secure session with the client device based on the authenticating the client device.

6. The computer-implemented method of claim 1, further comprising:

receiving a command packet from the client device, wherein the authenticating is further based on the port identifier from which the command packet is received; and executing one or more instructions included in the command packet based on the authenticating.

7. The computer-implemented method of claim 1, wherein the authenticating the client device further comprises determining that the sequence of port identifiers matches a preconfigured sequence of port identifiers or a generated sequence of port identifiers generated by an algorithm.

8. A computer program product comprising a computer readable storage medium having program instructions embodied therewith, the program instructions being executable by a computing device to cause the computing device to perform operations comprising:

receiving, from a client device and via a network device, a plurality of passcode packets as part of a request to be authenticated by the computing device;

recording a sequence comprising a plurality of respective transmission delay durations between the transmission of the plurality of the passcode packets; and authenticating the client device based on verifying the plurality of transmission delay durations against a sequence of delay durations predetermined to be provided by the client device between the transmission of the plurality of the passcode packets, wherein the sequence of delay durations comprises a plurality of different delay durations.

9. The computer program product of claim 8, wherein the operations further comprise recording a sequence of port identifiers corresponding to respective ports of the network device via which the plurality of passcode packets is received, wherein the authenticating is further based on the sequence of port identifiers.

10. The computer program product of claim 9, wherein the authenticating the client device further comprises determining that the sequence of port identifiers matches a preconfigured sequence of port identifiers or a generated sequence of port identifiers generated by an algorithm.

11. The computer program product of claim 8, wherein the authenticating is further based on authenticating a signature or payload value within at least one of the plurality of passcode packets.

12. The computer program product of claim 8, wherein the operations further comprise updating a feature available in an avionics system based on the authenticating.

13. The computer program product of claim 8, wherein the operations further comprise establishing a secure session with the client device based on the authenticating the client device.

14. The computer program product of claim 8, wherein the operations further comprise:

receiving a command packet from the client device, wherein the authenticating is further based on a port identifier from which the command packet is received; and executing one or more instructions included in the command packet based on the authenticating.

15. A system comprising:

a processor, a computer readable memory, a non-transitory computer readable storage medium associated with a computing device, and program instructions executable by the computing device to cause the computing device to perform operations comprising:

receiving, from a client device and via a network device, a plurality of passcode packets as part of a request to be authenticated by the computing device;

recording a sequence comprising a plurality of respective transmission delay durations between the transmission of the plurality of the passcode packets;

recording a sequence of port identifiers corresponding to respective ports of the network device via which the plurality of passcode packets is received; and authenticating the client device based on verifying the plurality of transmission delay durations against a sequence of delay durations predetermined to be provided by the client device between the transmission of the plurality of the passcode packets and verifying the sequence of port identifiers against a predetermined sequence of port identifiers, wherein the sequence of delay durations comprises a plurality of different delay durations.

16. The system of claim 15, wherein the authenticating the client device further comprises determining that the sequence of port identifiers matches a preconfigured sequence of port identifiers or a generated sequence of port identifiers generated by an algorithm.

17. The system of claim 15, wherein the authenticating is further based on authenticating a signature or payload value within at least one of the plurality of passcode packets.

18. The system of claim 15, wherein the operations further comprise updating a feature available in an avionics system based on the authenticating.

19. The system of claim 15, wherein the operations further comprise establishing a secure session with the client device based on the authenticating the client device.

20. The system of claim 15, wherein the operations further comprise:

receiving a command packet from the client device, wherein the authenticating is further based on the port identifier from which the command packet is received; and executing one or more instructions included in the command packet based on the authenticating.

* * * * *